United States Patent [19]

Sommer

[11] Patent Number: 5,547,431
[45] Date of Patent: Aug. 20, 1996

[54] ELECTRICALLY ENERGIZED OIL SHEAR DRIVE SYSTEM

[75] Inventor: Gordon M. Sommer, Grosse Pointe Farms, Mich.

[73] Assignee: Midwest Brake Bond Company, Warren, Mich.

[21] Appl. No.: 343,191

[22] Filed: Nov. 22, 1994

Related U.S. Application Data

[63] Continuation-in-part of Ser. No. 59,585, May 10, 1993, Pat. No. 5,454,765.

[51] Int. Cl.$^6$ ............................................. F16H 37/06
[52] U.S. Cl. ................... 475/154; 475/156; 475/346; 192/18 B
[58] Field of Search ..................... 475/154, 155, 475/156, 338, 339, 346, 348; 192/18 B

[56] References Cited

U.S. PATENT DOCUMENTS

| | | | |
|---|---|---|---|
| 1,462,740 | 7/1923 | Cotal | 475/154 |
| 1,623,349 | 4/1927 | Knutsen | 475/156 |
| 2,753,894 | 7/1956 | Lovshin et al. | 475/154 X |
| 2,865,232 | 12/1958 | Nardone | 475/156 |
| 2,918,832 | 12/1959 | Meyers | 475/156 |
| 3,002,402 | 10/1961 | Howe | 475/156 |
| 3,083,590 | 4/1963 | Mueller | 475/154 |
| 3,089,574 | 5/1963 | Howard | 192/18 B |
| 3,160,026 | 12/1964 | Rosen | 475/346 X |
| 3,487,438 | 12/1969 | Becker et al. | 192/18 B |
| 3,494,450 | 2/1970 | Mankowsky et al. | 192/18 B |
| 3,614,999 | 10/1971 | Sommer | 192/18 B |
| 3,675,510 | 7/1972 | Duggar, Jr. | 475/346 X |
| 3,696,898 | 10/1972 | Sommer | 192/18 A |
| 3,713,517 | 1/1973 | Sommer | 192/18 A |
| 3,970,176 | 7/1976 | Bucksch | 192/18 A X |
| 3,971,461 | 7/1976 | Conroy et al. | 192/18 A |
| 4,067,427 | 1/1978 | Cackley | 192/18 A |
| 4,096,931 | 6/1978 | Whitehurst | 192/18 A |
| 4,125,178 | 11/1978 | Monks | 192/18 A |
| 4,135,611 | 1/1980 | Spanke | 192/18 A |
| 4,183,425 | 1/1980 | Sommer | 192/18 A |
| 4,346,796 | 8/1982 | Ueno | 192/18 A |
| 4,432,443 | 2/1984 | Sommer | 192/12 R |
| 4,455,889 | 6/1984 | Hauser | 475/346 X |
| 4,494,635 | 1/1985 | Sommer | 192/18 A |
| 4,506,772 | 3/1985 | Sommer | 192/18 A |
| 4,516,444 | 5/1985 | Herr, Jr. | 192/12 C |
| 4,552,255 | 11/1985 | Sommer | 192/18 A |
| 4,577,738 | 3/1986 | Yater | 192/18 A |
| 4,592,251 | 6/1986 | Mason | 192/18 B |
| 4,598,804 | 7/1986 | Sommer | 192/34 |
| 4,607,736 | 8/1986 | Kelley | 192/18 A |
| 4,616,739 | 10/1986 | Sommer | 192/18 A |
| 4,643,282 | 2/1987 | Edi | 192/18 B |
| 4,693,350 | 9/1987 | Sommer | 192/18 A |
| 4,765,448 | 8/1988 | Sommer | 192/18 A |
| 4,865,172 | 9/1989 | Sommer | 192/18 A |
| 4,921,078 | 5/1990 | Sommer | 192/18 A |
| 5,172,798 | 12/1992 | Mabee | 192/18 B |
| 5,194,057 | 3/1993 | Sommer | 475/339 |
| 5,368,528 | 11/1994 | Farrell | 475/348 |

FOREIGN PATENT DOCUMENTS

57-86643  5/1982  Japan.

*Primary Examiner*—Khoi Q. Ta
*Attorney, Agent, or Firm*—Harness, Dickey & Pierce, P.L.C.

[57] ABSTRACT

A two speed drive has an input shaft and an output shaft. Between the input shaft and the output shaft is a first brake/clutch pack assembly, a planetary gear train and a second brake/clutch assembly. The two speed drive offers a low speed operation, a high speed operation and braking of the drive by the engagement and disengagement of the first and second brake/clutch pack assemblies. The planetary gear train includes one axially fixed planet gear with the remainder to the planet gears being allowed to move axially in order to equalize the load carried by each planet gear.

20 Claims, 4 Drawing Sheets

ELECTRICALLY ENERGIZED OIL SHEAR DRIVE SYSTEM

CROSS REFERENCE TO RELATED APPLICATIONS

This application is a continuation-in-part of U.S. application Ser. No. 08/059,585, filed May 10, 1993 now U.S. Pat. No. 5,454,765.

FIELD OF THE INVENTION

The present invention generally relates to press drives. More particularly, the present invention relates to a new and improved two speed press drive which utilizes two clutch packs to provide the braking, high speed and low speed operation of the drive unit.

BACKGROUND OF THE INVENTION

Two speed drives are known well in the art and have been used successfully for many years. The prior art designs of two speed drives experienced problems with the braking and clutching systems, the planetary gearing arrangements as well as the overall lubrication of the components of the press drive. These prior art designs of two speed drives utilized a plurality of dry clutch plates to hold and/or release the various members of the planetary system. Due to the wear between these friction plates, the drives required constant adjustment and replacement of the clutch and brake assemblies. During the operation of these dry clutch and brake assemblies, a significant amount of heat was generated. This generation of heat combined with the excessive wear of the friction plates can cause a fading of the brake or clutch system. Other problems associated with the earlier designs of two speed drives included the rigid mounting of the planetary gear system and the problem of poor lubrication of the various components within the drive. Experience has shown that the elements of a large, high-powered planetary gear set are adversely affected if any one of these elements are rigidly mounted. The rigid mounting of one of the elements can lead to an unequal sharing of the load between the mating elements. This unequal sharing of the load in combination with the stopping, starting and reversing of the planetary system leads to increased wear and downtime. The inadequate lubrication of the various components of the drive serves to again increase the wear and down time of the drive system.

Oil shear brakes and clutches have been developed to overcome the problems associated with the earlier designs of two speed drives. In an oil shear clutch or brake system, over 90% of the start/stop inertia is absorbed by a thin, but positive oil film between the friction plates. This thin oil film thus results in little or no wear between the plates and also little or no fading of the braking systems. The thin oil film between the plates also operates to remove the heat generated during the start/stop cycles of the press. With the generated heat being removed from the friction pates, there is no longer a practical limit on the drive trip rate or speed. The oil shear clutch and brake system also eliminates the problems associated with lubrication of the various components of the drive as the drive housing is now filled with lubricating oil for the oil shear clutch and brake system. These oil shear brakes and clutches have also been combined with full floating planetary gear elements to eliminate the unequal sharing of the load between the mating elements.

The two speed drive units incorporating oil shear brakes and clutches as well as full floating planetary gear elements have enjoyed wide acceptance in the two speed drive market. The continued development of these two speed drives is directed towards providing a more compact and lower cost drive without sacrificing the performance characteristics of the drive unit.

SUMMARY OF THE PRESENT INVENTION

The present invention provides the art with a two speed drive which utilizes two brake/clutch packs to provide a drive which offers high speed operation, low speed operation and braking of the drive. The two speed drive unit of the present invention incorporates oil shear designs of brake/clutch packs as well as full floating of the planetary gearing system.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
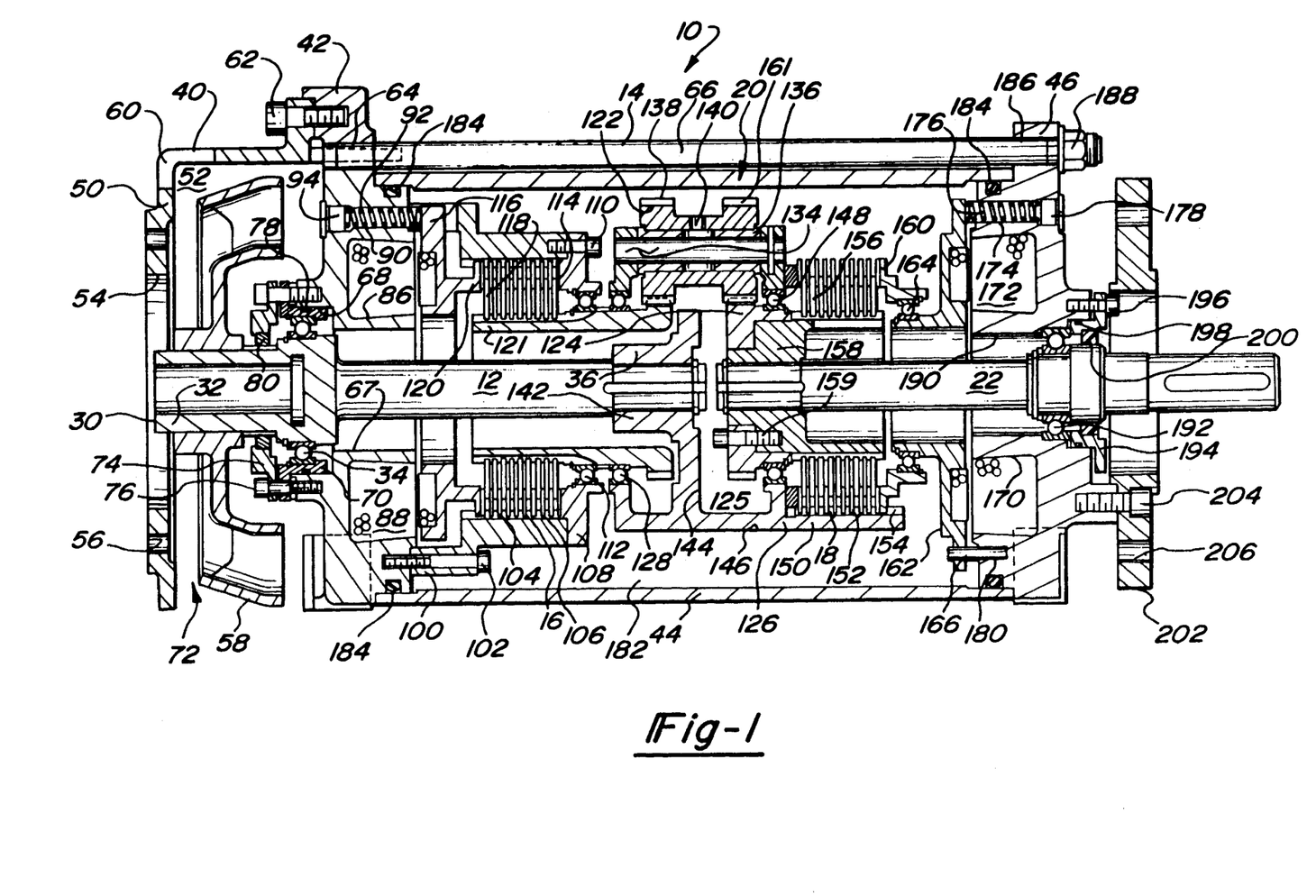
FIG. 1 is a side view partially in cross section of a two speed drive in accordance with the present invention configured for in-line motor mounting.

Referring now to the drawings in which like reference numerals designate like or corresponding parts throughout the several views, there is shown in FIG. 1 a two speed drive in accordance with the present invention which is designated generally by reference numeral 10. Two speed drive 10 comprises an input shaft 12, a housing assembly 14, a brake/clutch pack assembly 16, a brake/clutch pack assembly 18, a planetary gear train 20 and an output shaft 22.

Input shaft 12 is driven at one end 30 at a specified speed by a motor (not shown). The motor can be connected to input shaft 12 by various means known well in the art. In the embodiment shown in FIG. 1, end 30 of input shaft 12 is provided with a female spline 32 to facilitate connection to the drive motor. Input shaft 12 is rotatably disposed within housing assembly 14 by a roller bearing 34. The end of input shaft 12 opposite to drive end 30 extends through the center of brake/clutch pack assembly 16 and is drivingly connected at 36 to the carrier assembly of planetary gear train 20 as will be discussed later herein.

Housing assembly 14 comprises fan housing 40, brake/clutch control housing 42, central housing 44 and brake/clutch control housing 46. Fan housing 40 is generally cylindrical in shape and has a single end wall 50 which partially defines an internal cavity 52. End wall 50 has a cylindrical opening 54 provided therein to allow access to input shaft 12 by the drive motor. Disposed radially outward from opening 54 are a plurality of circumferentially spaced mounting holes 56 for securing fan housing 40 to the drive motor. The end of fan housing 40 opposite to end wall 50 is adapted to be fixedly secured to brake/clutch control housing 42. Disposed within interior cavity 52 is a fan 58 which is fixedly mounted to input shaft 12 for rotation therewith. Fan housing 40 has a plurality of air inlet apertures 60 which allow for the passage of cooling air being pumped by fan 58.

Brake/clutch control housing 42 is an annular shaped housing adapted to be fixedly secured to fan housing 40 by a plurality of circumferentially spaced mounting bolts 62 which are threadingly received in a plurality of mating threaded holes. Disposed radially inward from the plurality of mounting bolts 62 are a plurality of threaded holes 64 which receive a plurality of assembly rods 66. Rods 66 are utilized to maintain the integrity of the two speed drive as will be discussed later herein. The end of housing 42 opposite to mounting bolts 62 is adapted to be fixedly and sealingly attached to central housing 44. Housing 42 completes the formation of interior cavity 52 and defines a centrally located bore 67 which allows access for input shaft 12 to reach planetary gear train 20. Bore 67 defines an inner cylindrical surface 68 which supports roller bearing 34 and forms a locating surface for bearing seal housing 70. The interface between fan housing 50 and housing 42 defines a plurality of air outlet apertures 72 which allow for passage of cooling air being pumped by fan 58. Air outlet apertures 72 cooperate with air inlet apertures 60 to create a path for the air pumped by fan 58 to flow across two speed drive 10 to aid in the cooling of drive 10. Bearing seal housing 70 is adapted to be fixedly and sealingly attached to housing 42 by a retaining plate 74 and a plurality of circumferentially spaced bolts 76. A seal 78 is located between bearing seal housing 70 and inner cylindrical surface 68. Retaining plate 74 locates and retains seal housing 70 and also locates and secures an additional seal 80 disposed between retaining plate 74 and input shaft 12. Seal 80 rides against input shaft 12 and operates in conjunction with seal 78 to seal the oil disposed within two speed drive 10 as will be described later herein.

Disposed within brake/clutch control housing 42 is a clutch coil cavity 86 which is located in the end of brake/clutch control housing 42 adjacent to central housing 44. Disposed within clutch coil 86 is an AC voltage clutch coil 88. A plurality of circumferentially spaced spring bores 90 extend completely through housing 42 and are located in housing 42 radially outward from coil cavity 86. Disposed within each of the plurality of spaced spring bores 90 is a coil spring 92 and an access bolt 94 for providing access to spring 92 in order to change to a higher or lower rated spring without disassembling drive 10.

Attached to housing 42 on the same side as and facing clutch coil 88 is brake/clutch pack assembly 16 which comprises a friction plate retainer 100 secured to housing 42 by a plurality of bolts 102. The interior surface of friction plate retainer 100 is adapted with a plurality of circumferentially spaced axially extending splines 104 to support a plurality of driven clutch plates 106 of brake/clutch pack assembly 16. An end plate 108 is secured to retainer 100 by a plurality of circumferentially spaced bolts 110 and serves to mount bearing 112 which locates the sun gear of planetary gear train 20 as will be described later herein. End plate 108 also provides a braking surface 114 for brake/clutch pack assembly 16. Disposed between end plate 108 and clutch coil 88 is an annular clutch pressure plate 116. Disposed between clutch pressure plate 116 and end plate 108 are a plurality of driving plates 118 and the plurality of driven plates 106. The plurality of driving plates 118 are interleaved with the plurality of driven plates 106. Driving plates 118 are splined on their interior to be drivingly connected to the sun gear of planetary gear train 20 while driven plates 106 are splined on their exterior for being drivingly connected to splines 104 of retainer 100.

Annular clutch pressure plate 116 has an annular activation member 120 extending axially from it towards end plate 108. Activation member 120 is splined on its exterior to mate with splines 104 of retainer 100 similar to that of driven plates 106. The plurality of coil springs 92 urge pressure plate 116 and activation member 120 axially to the right as shown in FIG. 1. In this position, brake/clutch pack assembly 16 is in the engaged position. Upon activation of AC voltage clutch coil 88, clutch pressure plate 16 and clutch activation member 120 are magnetically attracted to brake/clutch control housing 42 and these components move axially to the left as shown in FIG. 1. The magnetic attraction of AC voltage clutch coil 88 overcomes the spring force of the plurality of coil springs 92 and brake/clutch pack assembly 16 is disengaged. When the power to AC voltage clutch coil 88 is terminated, the plurality of coil springs 92 urge clutch pressure plate 116 and clutch activation member 120 to the right as shown in FIG. 1, again disengaging brake/clutch pack assembly 16.

Planetary gear train 20 comprises a sun gear 121, a plurality of planet gears 122 and an output sun gear 124. Sun gear 121 is rotatably positioned relative to brake/clutch pack assembly 16 by bearing 112 and rotatably positioned relative to a carrier assembly 126 by a bearing 128. Sun gear 121 has a plurality of splines 130 located on its exterior surface for drivingly engaging the plurality of driving plates 118 as detailed above. Disposed at the end of sun gear 121 opposite to that of splines 130 is a toothed gear section 132 for driving engagement with the plurality of planet gears 122.

The plurality of planet gears 122 are rotatably mounted on carrier assembly 126 by a pin 134 and a pair of bearings 136. The plurality of planet gears 122 have a plurality of gear teeth 138 which meshingly engage sun gear 121. An oil hole 140 extends through each planet gear 122 to provide lubricant to bushings 136. Carrier assembly 126 is comprised of a central hub 142 which fixedly secures carrier assembly 126 to input shaft 12 for rotation therewith. Extending radially outward from hub 142 is a flange 144. Flange 144 extends radially outward and is attached to a generally U-shaped collar 146 which rotatably supports carrier assembly 126 within drive 10 by bearings 128 and a bearing 148. Bearing 148 is mounted between output sun gear 124 and U-shaped collar 146. U-shaped collar 146 is adapted at a plurality of circumferentially spaced locations for mounting pin 134 which rotatably supports the plurality of planetary gears 122. Extending axially from U-shaped collar 146 is a cylindrical housing 150 which forms the supporting member for a plurality of driving plates 152 of brake/clutch pack assembly 18. The interior surface of cylindrical housing 150 has a plurality of circumferentially spaced axially extending splines 154 for driving engagement with a spline formed on the outside edge of the plurality of driving plates 152. A plurality of driven plates 156 are interleaved with driving plates 152. Driven plates 156 have a plurality of splines formed in their inside edges for drivingly engaging a hub 158. Hub 158 has a plurality of splines formed on its outside diameter for engagement with driven plates 156 and is adapted on its internal diameter to be fixedly secured to output shaft 22 as will be described later herein. Hub 158 further has a plurality of threaded bores for fixedly securing output sun gear 124 to hub 158 by a plurality of bolts 159. Output sun gear 124 has a plurality of gear teeth 125 adapted to mate with gear teeth 161 located on planet gears 122.

An activation member 160 is rotatably supported on an annular clutch pressure plate 162 by a roller bearing 164. The exterior surface of activation member 160 is splined for engagement with spline 154 of housing 150. Annular clutch pressure plate 162 is secured to brake/clutch control housing 46 by a plurality of pins 166. Pins 166 prohibit rotational movement of pressure plate 162 but permit axial movement of pressure plate 162 with respect to control housing 46 for engagement and disengagement of brake/clutch pack assembly 18.

Brake/clutch control housing 46 forms a clutch coil cavity 170 which is located on the side of control housing 46 adjacent brake/clutch pack assembly 18. Disposed within clutch coil cavity 170 is an AC voltage clutch coil 172. A plurality of circumferentially spaced spring bores 174 extend through control housing 46 and are located radially outward from coil cavity 170. Disposed within each of the plurality of circumferentially spaced spring bores 174 is a coil spring 176 and an access bolt 178 for providing access to springs 176 in order to change to a higher or lower rated spring without disassembling drive 10. Pins 166 are fixedly secured into a plurality of holes 180 which extend into control housing 46. Coil springs 176 thus bias pressure plate 162 to the left along pins 166 as shown in FIG. 1. In this position, brake/clutch pack assembly 18 is in the engaged position. Upon activation of AC voltage clutch coil 172, clutch pressure plate 162 and clutch activation member 160 are magnetically attracted to brake/clutch control housing 46 and these components move axially to the right as shown in FIG. 1 along the plurality of pins 166. The magnetic attraction of AC voltage clutch coil 172 overcomes the spring force of the plurality of coil springs 176 and brake/clutch pack assembly is disengaged. When the power to AC voltage clutch coil 172 is terminated, the plurality of coil springs 176 urge clutch pressure plate 162 to the left as shown in FIG. 1, again engaging brake/clutch pack assembly 18. Control housing 46 has a plurality of circumferentially spaced holes 186 which receive assembly rods 66 to secure the components of two speed drive 10.

Central housing 44 extends between control housing 42 and control housing 46 to define an internal chamber 182. A pair of seals 184 seal the connection between central housing 44 and control housings 42 and 46. Assembly rods 66 which are threadingly received within threaded holes 64 of control housing 42, extend over central housing 44 and extend through the plurality of holes 186 in control housing 46. A plurality of nuts 188 trap central housing 44 between control housings 42 and 46 and define sealed chamber 182.

Brake/clutch control housing 46 defines a central bore 190 which mounts roller bearing 192 for rotatingly supporting output shaft 22. Bore 190 also forms a locating surface for a bearing seal housing 194. Bearing seal housing 194 is adapted to be fixedly and sealingly attached to control housing 46 by a plurality of circumferentially spaced bolts 196 and a seal 198. Bearing seal housing 194 locates an additional seal 200 which is disposed between bearing seal housing 194 and output shaft 22 to complete the sealing of chamber 182. Thus chamber 182 is fluidly sealed by seals 80, 78, 184, 198 and 200. Chamber 182 is filled with oil to provide lubricant for the oil shear brake/clutch assemblies 16 and 18 as well as providing lubrication for the components of two speed drive 10.

Output shaft 22 is fixedly secured to hub 158 for rotation therewith and extends through pressure plate 162 and bore 190 in control housing 46. Output shaft 22 is rotatably supported by bearing 192 and extends axially through bearing 192 to provide for the attachment of a driven device (not shown). A flange 202 is fixedly secured to control housing 46 by a plurality of bolts 204 to accommodate the attachment of the driven device using a plurality of holes 206.

The operation of two speed drive 10 begins with no power being supplied to the drive motor, brake/clutch assembly 16 and brake/clutch assembly 18. The drive motor is thus not running and brake/clutch pack assemblies 16 and 18 are both in the engaged position due to the biasing of the plurality of springs 92 and 176. In this condition, rotational movement of both input shaft 12 and output shaft 22 is prohibited. When power is applied to the drive motor, brake/clutch assembly 16 and brake/clutch assembly 18, input shaft 12 is free to rotate with the drive motor due to the disengagement of brake/clutch assembly 16 and the disengagement of brake/clutch assembly 18.

From this operating condition, the two speed drive can be switched to operate in a high speed or low speed condition. If high speed operation is desired, power is supplied to brake/clutch pack assembly 16 to place it in a disengaged condition and power is terminated to brake/clutch pack assembly 18 to place it in an engaged condition and lock carrier 126 to output shaft 22 for a direct driving relationship between input shaft 12 and output shaft 22. Power is transferred from input shaft 12 through hub 142 and carrier assembly 126 of planetary gear train 20. Power is transferred from planetary gear train 20 directly to output shaft 22 due to the engagement of brake/clutch pack assembly 18 and a direct driving relationship is achieved.

If low speed operation is desired, power is terminated to brake/clutch pack assembly 16 to place it in an engaged condition and power is supplied to brake/clutch pack assembly 18 to place it in a disengaged condition. This condition causes input shaft 12 to transmit rotation to output shaft 22 through planetary gear train 20 to provide a low speed drive operation. Power is transferred from input shaft 12 through hub 142 and carrier assembly 126 of planetary gear train 20. With sun gear 121 being locked by the engagement of brake/clutch pack assembly 16, power is transferred through planetary gears 122 to output sun gear 124 to provide the low speed operation. Output sun gear 124 directly drives output shaft 22 which is free to rotate relative to carrier assembly 126 due to the disengagement of brake/clutch pack assembly 18.

The braking of two speed drive 10 is accomplished by terminating power to both brake/clutch pack assembly 16 and brake/clutch pack assembly 18. Input shaft 12 is then attempting to drive output shaft 22 through both planetary gear train 20 and brake/clutch pack assembly 18 which has the effect of locking planetary gear train 20 and thus braking drive 10.

Figure 2:
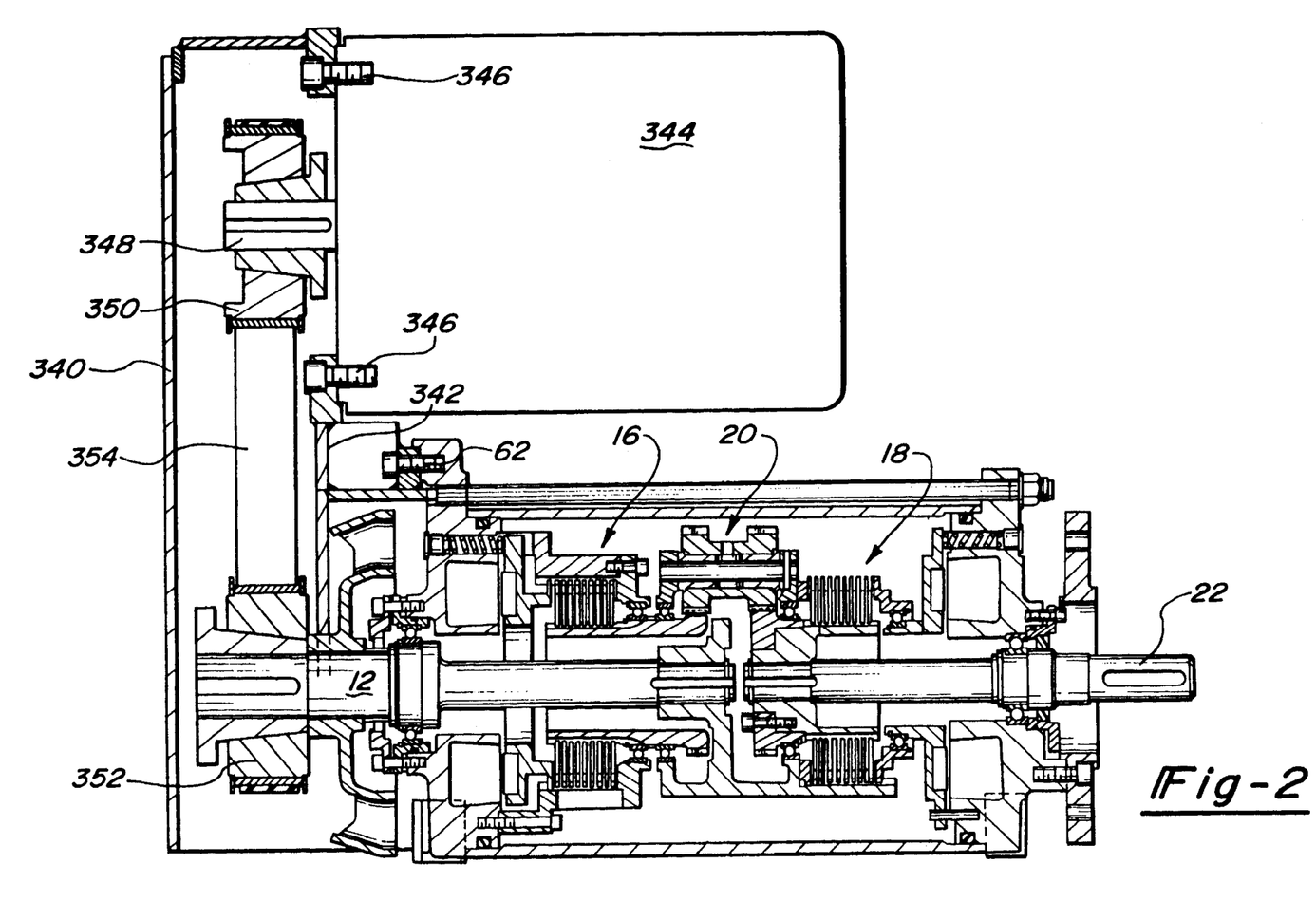
FIG. 2 is a side view partially in cross section of a two speed press drive in accordance with the present invention configured for U-type motor mounting.

FIG. 2 shows another embodiment of the present invention which shows adaption of the embodiment shown in FIG. 1 to incorporate a U-drive system when space limitations prohibit the in-line embodiment of FIG. 1. The two speed drive 10 of FIG. 2 is similar to two speed drive 10 of FIG. 1 with the exception of fan housing 340 which replaces fan housing 40. Fan housing 340 comprises a rear mounting plate 342 which is adapted to be secured to brake/clutch pack assembly 16 by the plurality of bolts 62. Rear mounting plate 342 also is adapted for the mounting of drive motor 344 by the plurality of bolts 346. Drive motor 344 has a drive shaft 348 which extends generally parallel to input shaft 12. A driving pulley 350 is fixedly secured to driveshaft 348 and a driven pulley 352 is fixedly secured to input shaft 12. A drive belt 354 extends between driving pulley 350 and driven pulley 352 to provide power from drive motor 344 to input shaft 12. The high speed, low speed and braking operations of two speed drive unit 310 is identical to that described above for two speed drive unit 10.

FIGS. 3 through 6 illustrate a two speed drive 410 which is similar to drive 10. In FIGS. 3 through 6, like or corresponding pads to those shown in FIG. 1 have been designated with like reference numerals. Two speed drive 410 comprises input shaft 12, housing assembly 14, brake/clutch pack assembly 16, brake/clutch pack assembly 18, a planetary gear train 420 and output shaft 22. Drive 410 and the operation of drive 410 is identical to drive 10 shown in FIG. 1 except for planetary gear train 420. Planetary gear train 420, as shown in FIGS. 3 through 6, comprises an input sun gear 421, three planet gears 422, output sun gear 424, and a carrier 426. Input sun gear 421 is rotatably positioned relative to brake/clutch pack assembly 16 by bearing 112 and rotatably positioned relative to planetary gear train 420 by bearing 128. Sun gear 421 includes splines 130 on its exterior surface for drivingly engaging the plurality of driving plates 118 as detailed above for FIG. 1. Disposed at the end of sun gear 421 opposite to that of splines 130 is a helical toothed gear section 432 for driving engagement with the plurality of planet gears 422.

Figure 5:
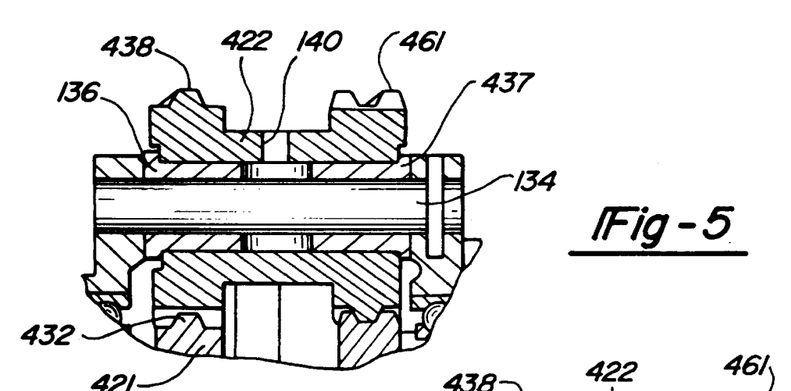
FIG. 5 is an enlarged sectional view illustrating the fixed planetary gear mounting system.
Figure 6:
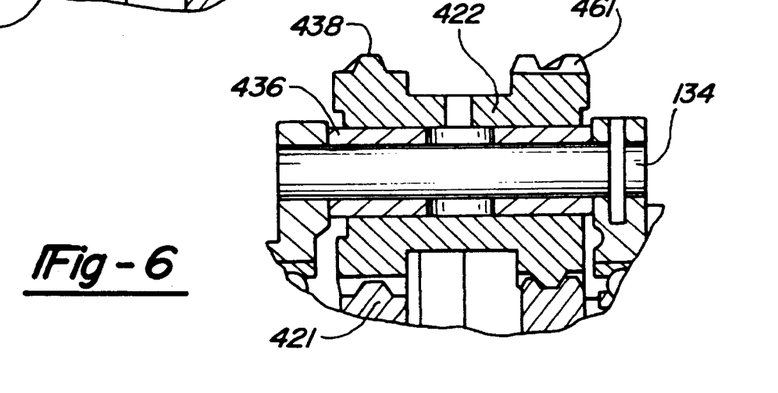
FIG. 6 is an enlarged sectional view similar to that of FIG. 4 but illustrating the floating planetary gear mounting system.

Planet gears 422 are rotatably mounted on carrier 426 by pin 134 with one of the planet gears 422 incorporating bearings 136 between planet gear 422 and pin 134, as shown in FIG. 5, and the remainder of the planet gears 422 incorporating bearing 436 between planet gear 422 and pin 134, as shown in FIG. 6. Planet gear 422, shown in FIG. 5 which includes bearings 136 between the gear and pin 134, is an axially fixed planet gear with bearings 136 each having an annular flange 437 extending radially outward from bearing 136 to limit the axial movement of fixed planet gear 422 relative to pin 134. Planet gear 422, shown in FIG. 6 which includes bearing 436 between the gear and pin 134, is allowed to move axially relative to pin 134 in order to balance the load distribution between planet gears 422 as will be described later herein.

Planet gears 422 each have a plurality of helical gear teeth 438 which meshingly engage with helical gear teeth 432 on sun gear 421. Oil hole 140 extends through each planet gear 422 to provide lubricant to bushings 136 and 436. Carrier 426 is comprised of central hub 142 which fixedly secures carrier 426 to input shaft 12 for rotation therewith. Extending radially outward from hub 142 is flange 144. Flange 144 extends radially outward and is attached to collar 146 which rotatably supports carrier 426 within drive 10 by bearings 128 and 148. Bearing 148 is mounted between output sun gear 424 and collar 146. Collar 146 is adapted at three circumferentially spaced locations for mounting pin 134 which rotatably supports a respective planetary gear 422. Extending axially from collar 146 is cylindrical housing 150 which forms the supporting member for the plurality of driving plates 152 of brake/clutch pack assembly 18 as described above for FIG. 1.

Figure 3:
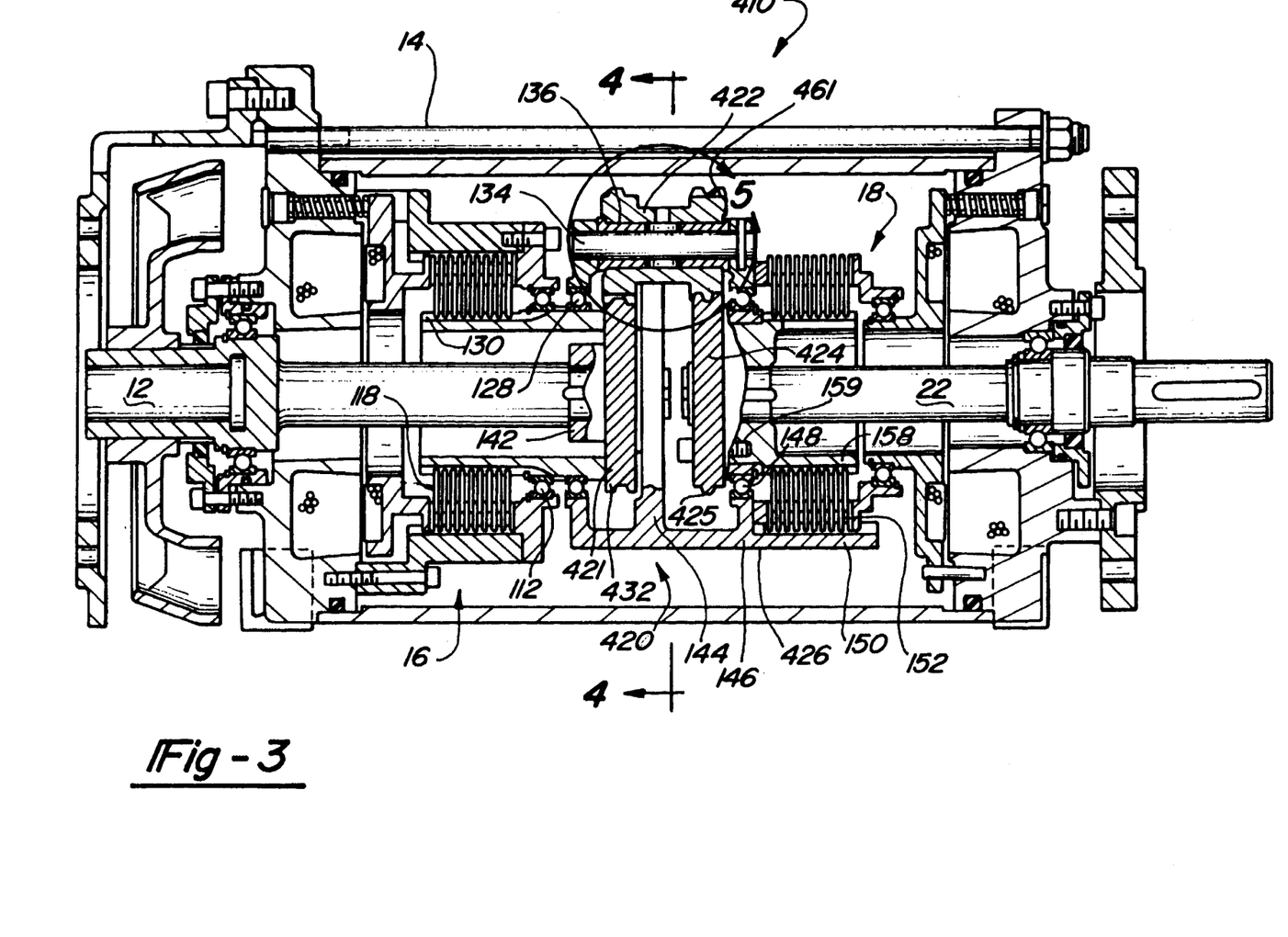
FIG. 3 is a side view similar to FIG. 1 but showing another embodiment of the present invention.
Figure 4:
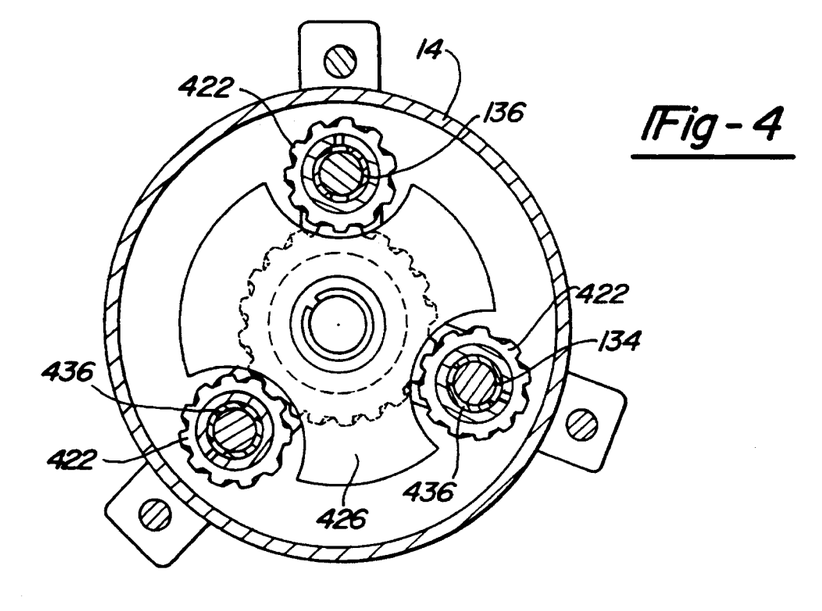
FIG. 4 is a sectional view of the planetary gear train taken in the direction of arrows 4—4 in FIG. 3 to show another embodiment of the present invention.

Output sun gear 424 is fixedly secured to hub 158 by the plurality of bolts 159 in a similar manner to output sun gear 124 shown in FIG. 1. Output sun gear 424 has a plurality of helical gear teeth 425 on its exterior surface which are designed to drivingly engage a second plurality of helical gear teeth 461 located on planet gears 422 opposite to helical gear teeth 438. Thus, each planet gear 422 includes helical gear teeth 438 disposed on one end and helical gear teeth 461 disposed on the opposite end. Helical gear teeth 438 are formed in a first direction with helical gear teeth 461 being formed in a second or opposite direction. Gear teeth 432 on input sun gear 421 are designed to mate with gear teeth 438 and gear teeth 425 on output sun gear 424 are designed to mate with gear teeth 461. The obliquity of teeth 432 and 438 set up an end or axial thrust towards one side of carrier 426 while the obliquity of teeth 425 and 461 in the opposite direction set up an end or axial thrust towards the opposite side of carrier 426.

Thus, the two planet gears 422 which are allowed to float axially among pin 134 will position themselves such that the two thrust loads mentioned above are equal but in an opposite direction. During operation of drive 410, the single planetary gear 422 which is limited in its axial movement by flanges 437 on bearings 136 acts to initially define the contact between the plurality of planet gears 422 and sun gears 421 and 424. The remaining planet gears 422 which are allowed to float due to bearings 436, independently move axially with respect to their associated pin 134 to positions which insure that the transmitted load between the three planet gears 422 will be generally equal. This equal sharing of the transmitted load significantly increases the durability of drive 410 while at the same time significantly decreasing the noise level attributed to the meshing of the gears. While the above description has, for exemplary purposes, defined carrier 426 as having three planet gears 422 with two being fixed, it is within the scope of the present invention to have all three planet gears float if desired. In addition, it is within the scope of the present invention to have more than three planet gears if desired. When additional planetary gears are included, the preferred embodiment has one of the planetary gears which will be fixed axially.

While the above detailed description describes the preferred embodiment of the present invention, it should be understood that the present invention is susceptible to modification, variation and alteration without deviating from the scope and fair meaning of the subjoined claims.

What is claimed is:

1. A two speed drive comprising:

input means for transmitting rotation to said two speed drive;

output means for transmitting rotation from said two speed drive;

a planetary gear train disposed between said input means and said output means, said gear train comprising;

a first gear member rotatably supported within said drive;

a second gear member rotatably supported within said drive;

a planetary member drivingly engaging said first and second gear members, said planetary member comprising a plurality of planet gears meshingly engaging said first and second gear members and a carrier rotatably supporting and circumferentially locating said plurality of planet gears with respect to said first and second gear members, each of said planet gears defining a respective planet gear axis of rotation, at least one of said planet gears being axially movable along said respective planet gear axis of rotation;

said input means being connected to one of said members of said planetary gear train, said output means being connected to another one of said members of said planetary gear train;

a selectively operable clutch for locking said first gear member of said planetary gear train to said output means to place said two speed drive in a first ratio, said clutch being capable of being positioned in an engaged or a disengaged condition;

a clutch biasing member to urge said clutch into said engaged condition; and a selectively operable brake for prohibiting movement of said second gear of said planetary gear train to place said two speed drive in a second ratio, said brake being capable of being positioned in an engaged or disengaged position, said input means and said output means being prohibited from rotation by placing said brake and said clutch in said engaged positions.

2. The two speed drive of claim 1 wherein said output means comprises a shaft rotatably mounted in a housing.

3. The two speed drive of claim 1 wherein said input means comprises a shaft rotatably mounted in a stationary housing.

4. The two speed drive of claim 1 wherein said clutch comprises a plurality of interleaved first friction disks alternately splined, respectively, to said output means and said first member of said planetary gear means.

5. The two speed drive of claim 1 wherein said brake comprises a plurality of interleaved second friction disks alternately splined, respectively, to said third member of said planetary gear train and a housing.

6. The two speed drive of claim 1 wherein said clutch is movable to said disengaged condition by an AC voltage coil.

7. The two speed drive of claim 1 wherein said brake is movable to said disengaged condition by an AC voltage coil.

8. The two speed drive of claim 1 wherein, at least one of said planet gears is fixed axially with respect to said respective planet gear axis of rotation.

9. The two speed drive of claim 1 wherein, at least one of said planetary gears includes a first helical gear and a second helical gear, said second helical gear being disposed in an opposite direction to said first helical gear.

10. The two speed drive of claim 1 further comprising a brake biasing member to urge said brake into said engaged condition.

11. A two speed drive comprising:

input means for transmitting rotation to said two speed drive;

output means for transmitting rotation from said two speed drive;

a planetary gear train disposed between said input means and said output means, said planetary gear train comprising:

a first gear member rotatably supported within said drive;

a second gear member rotatably supported within said drive;

a planetary member drivingly engaging said first and second gear members, said planetary member comprising a plurality of planet gears meshingly engaging said first and second gear members and a carrier rotatably supporting and circumferentially locating said plurality of planet gears with respect to said first and second gear members, each of said planet gears defining a respective planet gear axis of rotation, at least one of said planet gears being axially movable along said respective planet gear axis of rotation;

said input means being connected to one of said members of said planetary gear train, said output means being connected to another one of said members of said planetary gear train;

a selectively operable clutch for locking said first gear member of said planetary gear train to said output means to place said two speed drive in a first ratio, said clutch being capable of being positioned in an engaged or a disengaged condition;

a selectively operable brake for prohibiting movement of said second gear member of said planetary gear train to place said two speed drive in a second ratio, said brake being capable of being positioned in an engaged or disengaged position, said input means and said output means being prohibited from rotation by placing said brake and said clutch in said engaged positions; and a brake biasing member to urge said brake into said engaged condition.

12. The two speed drive of claim 11 wherein said output means comprises a shaft rotatably mounted in a housing.

13. The two speed drive of claim 11 wherein said input means comprises a shaft rotatably mounted in a stationary housing.

14. The two speed drive of claim 11 wherein said clutch comprises a plurality of interleaved first friction disks alternately splined, respectively, to said output means and said first member of said planetary gear means.

15. The two speed drive of claim 11 wherein said brake comprises a plurality of interleaved second friction disks alternately splined, respectively, to said third member of said planetary gear train and a housing.

16. The two speed drive of claim 11 wherein said clutch is movable to said disengaged condition by an AC voltage coil.

17. The two speed drive of claim 11 wherein said brake is movable to said disengaged condition by an AC voltage coil.

18. The two speed drive of claim 11 wherein, at least one of said planet gears is fixed axially with respect to said respective planet gear axis of rotation.

19. The two speed drive of claim 11 wherein, at least one of said planetary gears includes a first helical gear and a second helical gear, said second helical gear being disposed in an opposite direction to said first helical gear.

20. The two speed drive of claim 11 further comprising a clutch biasing member to urge said clutch into said engaged condition.

* * * * *

UNITED STATES PATENT AND TRADEMARK OFFICE
CERTIFICATE OF CORRECTION

PATENT NO. : 5,547,431
DATED : August 20, 1996
INVENTOR(S) : Gordon M. Sommer

It is certified that error appears in the above-indentified patent and that said Letters Patent is hereby corrected as shown below:

Col. 1, Line 45, "downtime" should be --down time--

Col. 1, Line 58, "pates" should be --plates--

Col. 2, Line 33, "mounting:" should be --mounting;-

Col. 4, Line 22, "clutch pressure plate 16" should be
    --clutch pressure plate 116--

Col. 4, Line 48, "bushings 136" should be --bearings 136--

Col. 7, Line 14, "pads" should be --parts--

Col. 7, Line 51, "bushings 136" should be --bearings 136--

Col. 8, Line 51, Claim 1, "comprising;" should be --comprising:--

Signed and Sealed this

Eleventh Day of March, 1997

Attest:

BRUCE LEHMAN

*Attesting Officer*   Commissioner of Patents and Trademarks